(12) United States Patent
Regnier

(10) Patent No.: US 7,370,137 B2
(45) Date of Patent: May 6, 2008

(54) INTER-DOMAIN DATA MOVER FOR A MEMORY-TO-MEMORY COPY ENGINE

(75) Inventor: Greg Regnier, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 11/110,565

(22) Filed: Jun. 6, 2005

(65) Prior Publication Data

US 2006/0277357 A1    Dec. 7, 2006

(51) Int. Cl.
*G06F 12/10* (2006.01)
(52) U.S. Cl. .............................. 711/6; 711/206; 710/26
(58) Field of Classification Search ............... 711/6, 711/203, 206, 165; 710/3, 22, 26
See application file for complete search history.

(56) References Cited

U.S. PATENT DOCUMENTS 7,035,963 B2 * 4/2006 Neiger et al. ................. 711/6
2002/0129187 A1 * 9/2002 Nayyar et al. ............... 710/306
2006/0004944 A1 * 1/2006 Vij et al. ........................ 711/6
2006/0069899 A1   3/2006 Schoinas et al.
2006/0075146 A1   4/2006 Schoinas et al.
2006/0143311 A1 * 6/2006 Madukkarumukumana et al. .................................................................... 710/1
2006/0206658 A1 * 9/2006 Hendel et al. ................. 711/6
2007/0162641 A1 * 7/2007 Oztaskin et al. .............. 710/22

* cited by examiner

Primary Examiner—Jack Lane
(74) Attorney, Agent, or Firm—Blakely, Sokoloff, Taylor & Zafman LLP

(57) ABSTRACT

Address translation for a source and destination of the data that utilizes different page tables. A direct memory access (DMA) engine is used as a memory-to-memory copy engine by utilizing a page-table walk and address translation for a source side of the copy, and an independent page-table walk and address translation for a destination side of the copy.

18 Claims, 3 Drawing Sheets

Inter-Domain Data Mover
(Platform/Chipset Integration Example)

INTER-DOMAIN DATA MOVER FOR A MEMORY-TO-MEMORY COPY ENGINE

Embodiments of the invention relate to the field of microprocessors, and more specifically, to input/output (I/O) virtualization.

DESCRIPTION OF RELATED ART

As microprocessor architecture becomes more and more complex to support high performance applications, I/O management presents a challenge.

Existing techniques to address the problem of I/O management have a number of disadvantages. One technique uses software-only I/O virtualization to support virtual machine (VM) I/O. This technique has limited functionality, performance, and robustness. The functionality seen by the guest operating system (OS) and applications is limited by the functionality supported by the virtual devices emulated in the VM monitor (VMM) software. The guest I/O operations are trapped by the VMM and proxied or emulated before being submitted to the underlying physical-device hardware, resulting in poor performance. In addition, all or parts of the device driver for the hardware device are run as part of the privileged VMM software, which may adversely affect overall robustness of the platform. Techniques using specialized translation structures can only support a specific device or a limited usage model. General I/O memory management units provide only support for I/O virtual address spaces of limited size or complexity.

Presently, address translation for a source and a destination of the data utilizes the same page table.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Figure 1:
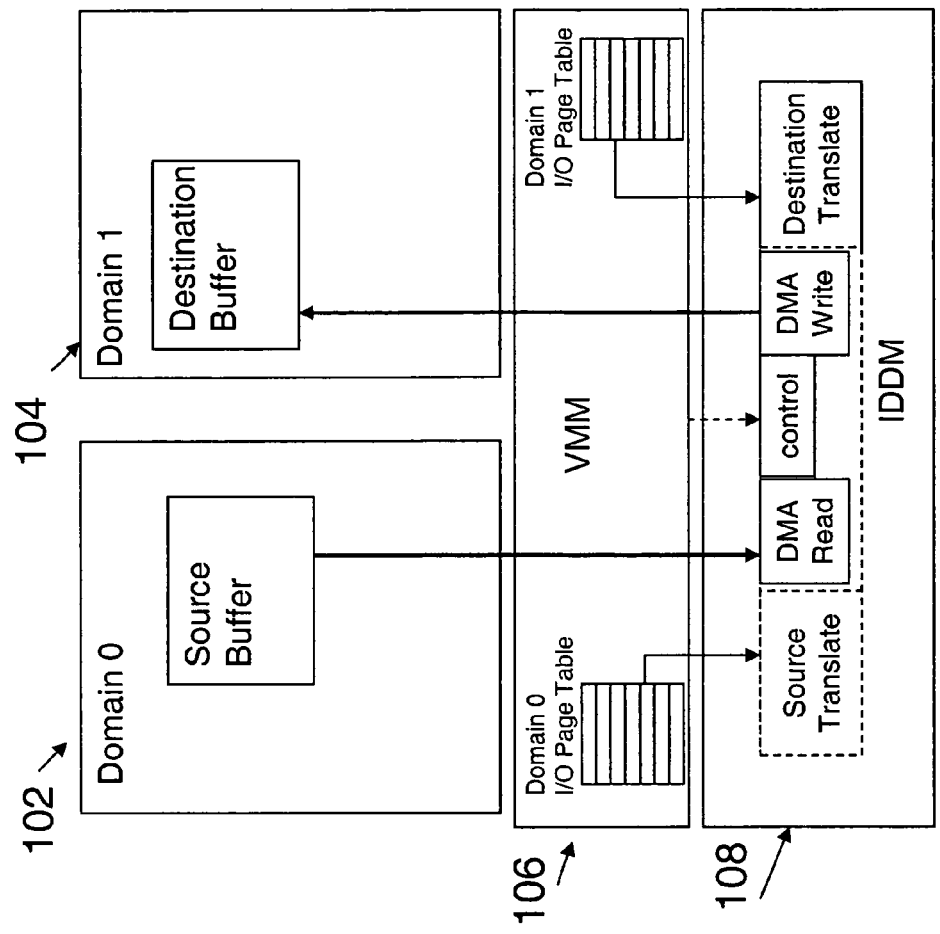
FIG. 1 is an apparatus for an architecture for performing address translations for a source and a destination of the data that utilizes the same page table

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

In one embodiment, the present application utilizes claimed subject matter depicted in pending applications:

1) "ADDRESS TRANSLATION FOR INPUT/OUTPUT DEVICES USING HIERARCHICAL TRANSLATION TABLES", application Ser. No. 10/956,198, filed Sep. 30, 2004(US 2006/0075146 A1)
2) "PERFORMANCE ENHANCEMENT OF ADDRESS TRANSLATION USING TRANSLATION TABLES COVERING LARGE ADDRESS SPACES", application Ser. No. 10/957,306 filed Sep. 30, 2004(US 2006/0069899 A1).

An area of current technological development relates to input/output (I/O) virtualization As previously described, address translation for a source and a destination of the data that utilizes the same page table. In contrast, this patent application teaches a system and method for an address translation for a source and a destination of the data that utilizes different page tables. This system and method utilizes a direct memory access (DMA) engine as a memory-to-memory copy engine. For example, in one embodiment, the system utilizes a DMA engine, a page-table walk and address translation for a source side of the copy, and an independent page-table walk and address translation for a destination side of the copy.

In one embodiment for a general usage model, the discussed apparatus, system and method can be used to move any type of data between virtual machines or address domains. For example, the apparatus may be incorporated within a chipset of a computer platform, as depicted in connection with FIG. 2. In contrast, in another embodiment, the discussed system and method can be used for a network usage model that utilizes an existing address translation scheme to provide inter virtual machine/domain data movement within the network. For example, the apparatus may be incorporated within an integrated chip, such as, a network interface controller where a loopback mechanism could be used for inter-VM communications, as depicted in connection with FIG. 3. In the second embodiment, one example of an existing address translation scheme is discussed in the related patent applications P20127 and P20128 for that specific page table model.

Virtualization is a technique in which a computer system is partitioned into multiple isolated virtual machines (VMs), each of which appears to the software within it to be a complete computer system. The software running within each VM—including the operating system in the VM—may be unaware of any of the other VMs, or even that the computer system is partitioned. The virtual machine monitor (VMM) is responsible for providing the environment in which each VM runs and maintaining isolation between the VMs.

FIG. 1 is an apparatus for an architecture for performing address translations for a source and a destination of the data that utilizes the same page table. In this embodiment, the claimed subject matter teaches moving data between a first virtual machine address domain 102 and a second virtual machine address domain 104. In this embodiment, software, such as, VMM 106, controls this operation. Specifically, address translation and validation utilizes the I/O page tables (domain 0 I/O page table and domain 1 I/O page table) of the source domain (102) and the destination address domain (104), respectively. In one embodiment, the configuration is for the page table model as defined in the related applications and allows for the address translation to be from Guest Physical Address to Host Physical Address (which is discussed in further detail in the related applications). In contrast, for other embodiments for different configurations, a virtual address to physical address translation is performed.

As previously discussed, the memory to memory copy operation consist of first performing a source translate that is based on a page table walk for domain 0 (VM0) I/O page table, then a DMA read based on the source buffer of domain 0. Subsequently, a destination translate is performed that is based on a page table walk for domain 1 (VM1) I/O page table, then completing with a DMA write to the destination buffer in domain 1.

In one embodiment, the Virtual machine monitors (VMM) are discussed in further detail in the related applications P20127 and P20128.

Figure 2:
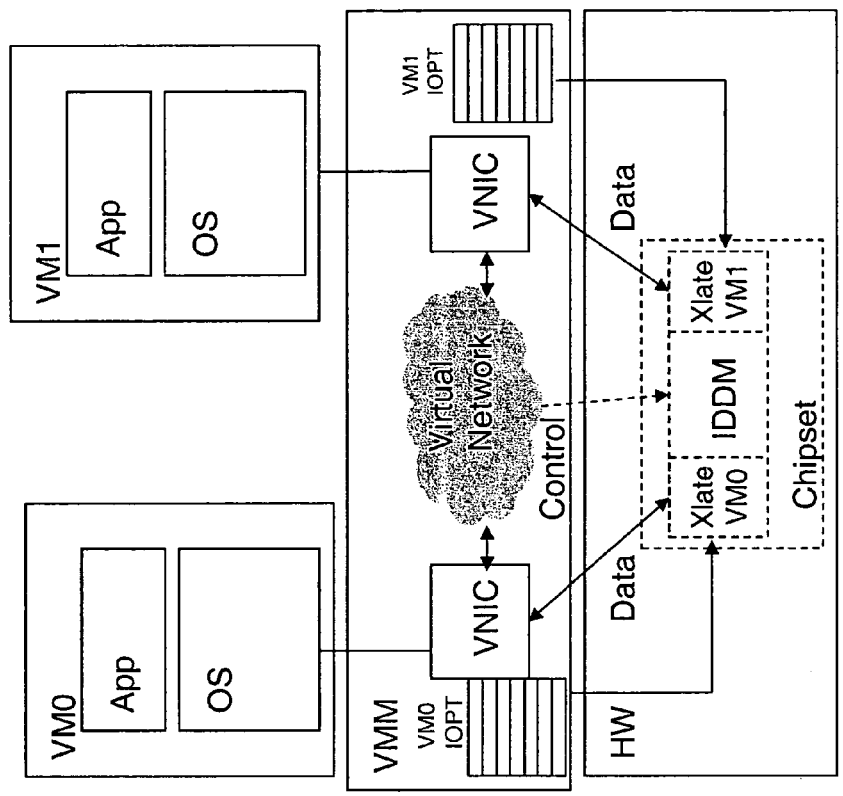
FIG. 2 is a system illustrating an embodiment for moving data between virtual machines or address domains in accordance with the claimed subject matter.

FIG. 2 is a system illustrating an embodiment for moving data between virtual machines or address domains in accordance with the claimed subject matter. The IDDM block 108 was previously described in connection with FIG. 1. In this embodiment, the IDDM block 108 is integrated into the platform/chipset to provide a general usage model for inter-VM (Virtual Machine) communications. As previously described, the VMM Software controls the operation and synchronization of the IDDM.

Virtual machine 0 (VM0) and Virtual machine 1 (VM1) are utilizing an operating system and may be running an application. The OS communicates with both Virtual Network interface controller (VNICs) and may request copies of data between the virtual machines. As previously described, the VMM Software controls the operation and synchronization of the IDDM.

In this embodiment, a first Virtual Network interface controller (VNIC) will direct and supervise the translation for VM0 based on the page table walk for domain 0 I/O page table. Likewise, a second Virtual Network interface controller (VNIC) will direct and supervise the translation for VM1 based on the page table walk for domain 1 I/O page table.

In one embodiment, the configuration is a page table model as defined in the related applications and allows for the address translation to be from Guest Physical Address to Host Physical Address (which is discussed in further detail in the related applications). In contrast, for other embodiments for different configurations, a virtual address to physical address translation is performed.

Figure 3:
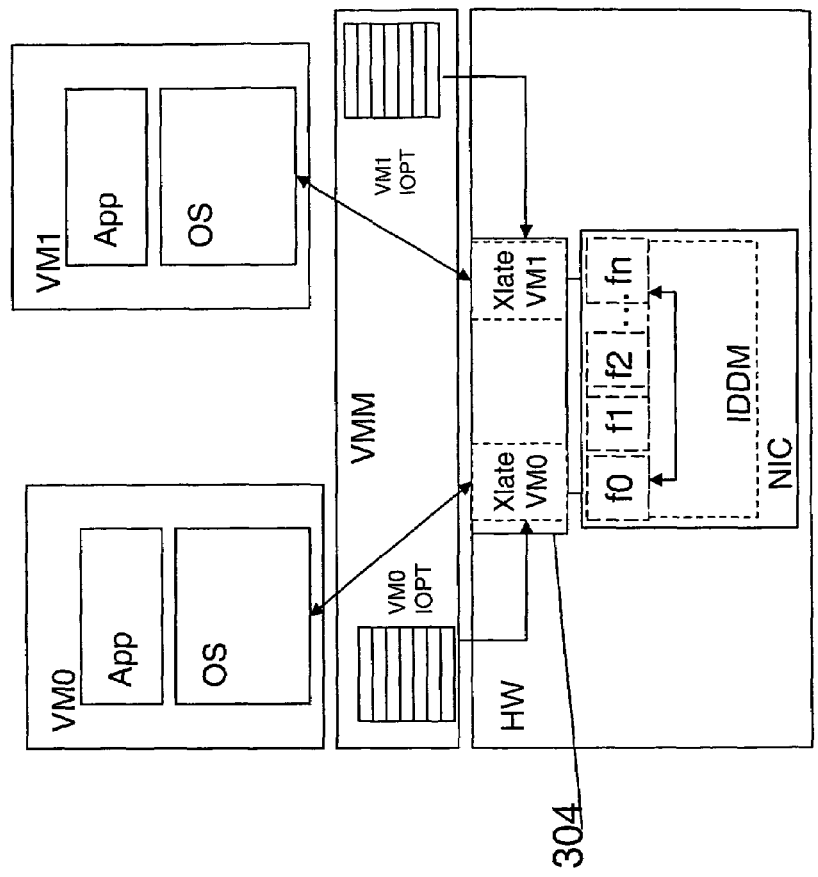
FIG. 3 is a system illustrating an embodiment for a network usage model that utilizes an existing address translation scheme to provide inter virtual machine/domain data movement within the network in accordance with the claimed subject matter.

FIG. 3 is a system illustrating an embodiment for a network usage model that utilizes an existing address translation scheme to provide inter virtual machine/domain data movement within the network in accordance with the claimed subject matter. The IDDM block 108 was previously described in connection with FIG. 1. In this embodiment, the IDDM block 108 is integrated into a Network Interface Controller (NIC) 302 and a chipset 304 to perform translation. In one embodiment, the chipset 304 performs address translation from Guest Physical Address to Host Physical Address for a page table model as defined in the related applications.

In this embodiment, FIG. 3 allows for a memory to memory transfer between the virtual machines on a single platform that appear as a normal network transfer to each respective virtual machine.

Virtual machine 0 (VM0) and Virtual machine 1 (VM1) are utilizing an operating system and may be running an application. The OS communicates with both Virtual Network interface controller (VNICs) and may request copies of data between the virtual machines. In this embodiment, NIC supports multiple PCI functions (f0, . . . , fn) that can be assigned to various Virtual Machines.

In this embodiment, network transfers destined for a Virtual Machine (VM0 or VM1) on the same platform are translated based on PCI source address. Also, control and synchronization accomplished through the NIC interfaces.

As previously discussed for FIGS. 1 and 2, the VMM controls the memory-to-memory copy operation. In this embodiment for FIG. 3, the VMM controls the interface to the NIC (network interface controller) with each respective virtual machine. As previously discussed, the memory to memory copy operation consist of first performing a source translate that is based on a page table walk for domain 0 (VM0) I/O page table, then a DMA read based on the source buffer of domain 0. Subsequently, a destination translate is performed that is based on a page table walk for domain 1 (VM1) I/O page table, then completing with a DMA write to the destination buffer in domain 1.

The claimed subject matter is not limited to two virtual machines, VM0 and VM1. One skilled in the art appreciates incorporating more virtual machines with logic to handle the translations for the respective page table walk.

While certain features of the claimed subject matter have been illustrated and detailed herein, many modifications, substitutions, changes and equivalents will now occur to those skilled in the art. It is, therefore, to be understood that the appended claims are intended to cover all such modifications and changes as fall within the true spirit of the claimed subject matter.

The invention claimed is:

1. A method for moving data between virtual machines comprising:
    a first address translation of a source copy of the data based on a first page table; and
    a second address translation of a destination copy of the data based on a second page table, wherein the second page table is independent from the first page table.

2. The method of claim 1 wherein the first page table is an input/output (I/O) page table for a first virtual machine.

3. The method of claim 2 further comprising:
    performing a DMA read based on a source buffer of the first virtual machine after the first address translation.

4. The method of claim 1 wherein the second page table is an input/output (I/O) page table for a second virtual machine.

5. The method of claim 4 further comprising:
    performing a DMA write based on a destination buffer of the second virtual machine after the second address translation.

6. A method for moving data between virtual machines comprising:
    a first address translation of a source copy of the data based on a first page table;
    performing a DMA read based on a source buffer of the first virtual machine after the first address translation a second address translation of a destination copy of the data based on a second page table, wherein the second page table is independent from the first page table; and
    performing a DMA write based on a destination buffer of the second virtual machine after the second address translation.

7. The method of claim 6 wherein the second page table is independent from the first page table.

8. The method of claim 6 wherein the first page table is an input/output (I/O) page table for a first virtual machine.

9. The method of claim 6 wherein the second page table is an input/output (I/O) page table for a second virtual machine.

10. A system to move data between a first virtual machine and a second virtual machine comprising;
    a memory;
    an input/output (I/O) device requesting an I/O transaction,
        a chipset coupled to the I/O device, the chipset to perform a translation from a guest physical address to a host physical address for a first type of page table model; perform a translation from a virtual address to a physical address for a second type of page table model.

11. The system of claim 10 wherein the first type of page table model utilizes a table structure indexed by the source identifier to map the I/O device to a domain assigned to the I/O device in the memory, and an address translation structure coupled to the table structure to translate the guest physical address to a host physical address corresponding to the I/O transaction.

12. A chipset to facilitate moving data between virtual machines comprising:
   a first virtual network interface controller to coordinate a first address translation; and
   a second virtual network interface controller to coordinate a second address translation, wherein the first and second address translations utilize different page tables.

13. The chipset of claim 12 wherein the first address translation utilizes a first page table that is an input/output (I/O) page table for a first virtual machine.

14. The chipset of claim 12 wherein the second address translation utilizes a second page table that is an input/output (I/O) page table for a second virtual machine.

15. The chipset of claim 12 wherein a DMA read that is based on a source buffer of the first virtual machine is performed after the first address translation.

16. The chipset of claim 12 wherein a DMA write that is based on a destination buffer of the second virtual machine is performed after the second address translation.

17. A network interface controller (NIC) to facilitate moving data between virtual machines comprising:
   the network interface controller that supports multiple PCI functions that can be assigned to the virtual machines; and
   the network transfers destined for a virtual machine on a same platform are based on a PCI source address, wherein the NIC supports translations for a source and a destination copy of the data for the network transfers that utilize different page tables.

18. A network interface controller (NIC) to facilitate moving data between virtual machines comprising:
   a virtual machine monitor to control interface to the NIC for each respective virtual machine; and
   the NIC to provide for a memory to memory transfer between the virtual machine on a single platform that appear as a normal network transfer to each respective virtual machine, wherein the NIC supports translations for a source and a destination copy of the data for the network transfers that utilize different page tables.

* * * * *